United States Patent Office 2,971,955
Patented Feb. 14, 1961

2,971,955
CYCLOHEXYLCARBINOL DERIVATIVES OF PIPERAZINE

Harold E. Zaugg, Lake Forest, and Robert W. De Net, Waukegan, Ill., assignors to Abbott Laboratories, North Chicago, Ill., a corporation of Illinois No Drawing. Filed Dec. 29, 1958, Ser. No. 783,107

6 Claims. (Cl. 260—268)

This invention relates to novel cyclohexylcarbinol derivatives of piperazine, in particular, a cyclohexylcarbinol substituted group on the β-carbon of 1,4-disubstituted piperazine. The compounds of this invention are represented by:

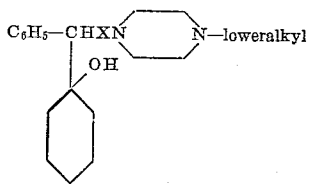

where X is carbonyl or methylene.

The method for preparing the foregoing compounds basically provides for the reaction of a substituted phenylacetamide with cyclohexanol under vanov conditions to produce the amide carbonyl derivative where X is CO in the foregoing generic formula. Reduction of this compound by lithium aluminum hydride results in the compound where X is $CH_2$ in the foregoing generic formula.

It will be apparent that the novel compounds disclosed herein contain a basic tertiary nitrogen group in the 4-position of the piperazine ring when X is carbonyl. When X is methylene, there are two basic tertiary nitrogen groups. The latter situation provides two siti for acid addition and quaternary ammonium salts, and the former provides one situs for like salt formation.

Compounds providing two basic tertiary nitrogen groups can be converted to a mono-salt form by addition of an equivalent amount of an acid or quaternizing agent; the di-salt form is obtained by adding an excess of the acid or quaternizing agent thereto.

The acid addition salts may be formed with variety of inorganic acids such as sulfuric, phosphoric, hydrochloric, hydrobromic, hydriodic, sulfamic and like acids. Strongly organic acids may also be used such as citric, lactic, maleic, malic, succinic, cinnamic, acetic, benzoic, gluconic, ascorbic, cyclohexylsulfamic and related acids.

The quaternary ammonium salts can be formed by the addition of alkyl halides such as chlorides and bromides of methyl, ethyl, propyl, isopropyl, allyl, butyl and isobutyl alkyls.

The bases and salts possess utility as antispasmodic agents, that is, agents effective in reducing smooth muscle spasms.

The following examples are set out to illustrate an embodiment of the preparation of the instant compounds, but such examples are not intended to be an exclusive embodiment thereof.

EXAMPLE I

*1-methyl-4-phenylacetylpiperazine*

A solution of 100 gms. (1.0 mole) of 1-methylpiperazine in 200 ml. of dry ether is added dropwise with stirring to a cooled solution of 77.2 gms. (0.5 mole) of phenylacetyl chloride in 200 ml. of dry ether. Enough water is added to dissolve the precipitated hydrochloride and the ether layer is separated. The aqueous layer is saturated with solid potassium carbonate and the oil which separates out is taken up in ether, combined with the original ether layer and dried over anhydrous magnesium sulfate. Filtration, removal of the ether by distillation and fractional distillation of the residue yields 65 gms. (60%) of 1-methyl-4-phenylacetylpiperazine, B.P. 135–145° C., (0.5 mm.), $n_D^{25}$ 1.5480. A sample is converted to the hydrochloride salt which melts at 209–210° C.

Anal. Calcd. for $C_{13}H_{19}ClN_2O$. Calculated: C, 61.29%; H, 7.52%; N, 11.00%. Found: C, 61.58%; H, 7.65%; N, 10.92%.

EXAMPLE II

*1 - [(α - 1' - hydroxycyclohexyl) - α - phenylacetyl] - 4-methylpiperazine*

To a Grignard reagent prepared from 1.8 gms. (0.075 mole) of magnesium and 9.3 gms. (0.075 mole) of isopropyl bromide in 100 ml. of dry ether is added a solution of 11 gms. (0.05 mole) of 1-methyl-4-phenylacetylpiperazine in 100 ml. of dry benzene. The ether is removed by distillation and the mixture is stirred and refluxed for three hours. A solution of 7.3 gms. (0.075 mole) of cyclohexanol in 50 ml. of dry benzene is added and stirring and refluxing is continued for an additional three hours. The mixture is allowed to stand at room temperature for several days, cooled and treated slowly with a saturated aqueous solution of ammonium chloride. The benzene is separated and the aqueous layer is extracted with ether which is then combined with the benzene. The organic extract is washed thoroughly with water to remove unreacted 1-methyl-4-phenylacetylpiperazine and then extracted with dilute hydrochloric acid, shaken with charcoal, filtered and made strongly alkaline with aqueous potassium hydroxide. The precipitated oil is taken up in ether and dried over anhydrous magnesium sulfate. Filtration and removal of the ether by distillation gives a viscous residue which is dissolved in hot hexane, treated with charcoal, filtered and concentrated.

The solution is cooled in ice and scratched to induce crystallization. The product is obtained in a yield of 5.1 gms. (32%), M.P. 120° C. Recrystallization of the sample raised the M.P. to 122–123° C.

Anal. Calcd. for $C_{19}H_{28}N_2O_2$. Calculated: C, 72.11%; H, 8.92%; N, 8.85%. Found: C, 72.14%; H, 9.20%; N, 8.88%.

EXAMPLE III

*1 - [(α - 1' - hydroxycyclohexyl) - α - phenylacetyl] - 4-methylpiperazine methiodide*

The methiodide salt of the base of Example II is prepared by treatment of the base with methyl iodide. The melting point of the quaternary ammonium salt is 165° C.

Anal. Calcd. for $C_{20}H_{31}IN_2O_2 \cdot \frac{1}{2}H_2O$. Calculated: C, 51.39; H, 6.90%; N, 5.99%; O, 8.55. Found: C, 51.41%; H, 6.98%; N, 6.13%; O, 8.57%; I, 27.11%.

EXAMPLE IV

*1 - [α - 1' - hydroxycyclohexyl) - α - phenylacetyl] - 4-methylpiperazine methobromide*

The methobromide salt of the base of Example II is prepared by treatment of the base with methobromide. The quaternary ammonium salt has a melting point of 223–224° C.

Anal. Calcd. for $C_{20}H_{31}BrN_2O_2$. Calculated: C, 58.39%; H, 7.59%; N, 6.81%. Found: C, 58.30%; H, 7.54%; N, 7.01%.

EXAMPLE V

1-(β-1'-hydroxycyclohexyl)-β-phenylethyl-4-methylpiperazine

A mixture of 6.2 gms. (0.0196 mole) of the base of Example 11 and 3.04 gms. (0.08 mole) of lithium aluminum hydride is refluxed in ether for four hours, allowed to stand at room temperature and refluxed for an additional four hours. The stirred mixture is treated slowly with water until it no longer refluxes spontaneously. Insoluble salts are removed by filtration and washed with ether. The combined filtrate and washings are dried over anhydrous potassium carbonate. Filtration and removal of the ether by distillation gives a solid residue which is recrystallized once from hexane to give 4.5 gms. (72%) of the named product M.P. 104–105° C.

Anal. Calcd. For $C_{19}H_{30}N_{2}O$. Calculated: C, 75.45%; H, 9.99%; N, 9.26%. Found: C, 75.72%; H, 9.87%; N, 9.40%.

EXAMPLE VI

1-[(β-1'-hydroxycyclohexyl)-β-phenylethyl]-4-methylpiperazine monomethiodide The monomethiodide salt of the base of Example V is prepared by treating a sample of said base with an equivalent quantity of methyl iodide in chloroform solution at room temperature, M.P. 190–191° C.

Anal. Calcd. For $C_{20}H_{33}IN_{2}O$. Calculated: C, 54.05%; H, 7.48%; N, 6.30%. Found: C, 54.00%; H, 7.76%; N, 6.41%.

The dimethiodide salt is prepared by dissolving the base of Example V in ether and adding thereto excess methyl iodide in ether.

In a similar manner, the monohydrochloride and dihydrochloride acid addition salts are prepared by the respective introduction of an equivalent and an excess amount of hydrochloride.

Others may practice the invention in any of the numerous ways which will be suggested by this disclosure to one skilled in the art. All such practice of the invention is considered to be a part hereof provided it falls within the scope of the appended claims.

We claim:
1. 1-[(α-1'-hydroxycyclohexyl)-α-phenylacetyl]-4-methylpiperazine.
2. 1-[(α-1'-hydroxycyclohexyl)-α-phenylacetyl]-4-methylpiperazine methiodide.
3. 1-[(α-1'-hydroxycyclohexyl)-α-phenylacetyl]-4-methylpiperazine methobromide.
4. 1-[(β-1'-hydroxycyclohexyl)-β-phenylethyl]-4-methylpiperazine.
5. 1-[(β-1'-hydroxycyclohexyl)-β-phenylethyl]-4-methylpiperazine monomethiodide.
6. A compound selected from the group consisting of bases having the formula:

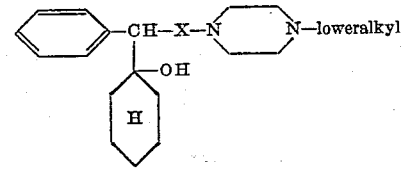

where X is selected from the group consisting of a carbonyl radical and a methylene radical; the non-toxic acid addition salts thereof; and the non-toxic lower alkyl quaternary ammonium salts thereof.

References Cited in the file of this patent

UNITED STATES PATENTS

| | | |
|---|---|---|
| 2,649,444 | Barret | Aug. 18, 1953 |
| 2,748,127 | Baltzly | May 29, 1956 |

OTHER REFERENCES

Ide et al., Jour. Amer. Chem. Soc., vol 77 (1955), pp. 3142–3143.

Fieser et al., Organic Chemistry, (Second Edition), 1950, pp. 116–117 and 226–227.